US010529218B2

(12) United States Patent
Marra et al.

(10) Patent No.: US 10,529,218 B2
(45) Date of Patent: Jan. 7, 2020

(54) SYSTEM AND METHOD FOR MONITORING THE HAND-CLEANING PRACTICES IN A HOSPITAL ENVIRONMENT, AND A WEARABLE DEVICE TO BE WORN BY A USER IN A HOSPITAL ENVIRONMENT

(71) Applicants: Sociedade Beneficente Israelita Brasileira Hospital Albert Einstein, São Paulo (BR); I-HealthSys Produtos Médicos Ltda—ME, São Carlos (BR)

(72) Inventors: Alexandre Rodrigues Marra, São Paulo (BR); Marcelo Prado, São Carlos (BR); Renaldo Massini Junior, São Carlos (BR); Alvaro Costa Neto, São Carlos (BR)

(73) Assignees: Sociedade Beneficente Israelita Brasileira Hospital Albert Einstein, São Paulo (BR); I-HealthSys Produtos Médicos Ltda — ME, São Carlos (BR)

( * ) Notice: Subject to any disclaimer, the term of this patent is extended or adjusted under 35 U.S.C. 154(b) by 280 days.

(21) Appl. No.: 15/593,090

(22) Filed: May 11, 2017

(65) Prior Publication Data
US 2018/0308339 A1 Oct. 25, 2018

(30) Foreign Application Priority Data
Apr. 19, 2017 (BR) .............................. 102017008096

(51) Int. Cl.
*G08B 21/24* (2006.01)
*G06T 11/60* (2006.01)
*G06F 1/16* (2006.01)

(52) U.S. Cl.
CPC ........... *G08B 21/245* (2013.01); *G06F 1/163* (2013.01); *G06T 11/60* (2013.01)

(58) Field of Classification Search
CPC .................................................. G08B 21/245
See application file for complete search history.

(56) References Cited

U.S. PATENT DOCUMENTS

| | | | |
|---|---|---|---|
| 2009/0112541 A1* | 4/2009 | Anderson | G09B 19/0076 703/11 |
| 2014/0279603 A1* | 9/2014 | Ortiz | G06Q 30/018 705/317 |
| 2016/0171179 A1* | 6/2016 | Donofrio | G06F 16/26 705/2 |

* cited by examiner

*Primary Examiner* — Hongmin Fan
(74) *Attorney, Agent, or Firm* — Patterson + Sheridan, LLP

(57) ABSTRACT

One describes a system (1) for monitoring hand-cleaning practices in a hospital environment, the system (1) comprising a set of sensors (2, 3, 4, 5) configured as at least one from: at least one infrared sensor (2) establishing a heat detection zone (20), at least one from a contact sensor (3) and a movement sensor (4) associated to at least one article (10, 10', 10") of the hospital environment, at least one actuation sensor (5) of an aseptic substance dispenser (6), the set of sensors (2, 3, 4, 5) being configured to generate a plurality of cleaning signals (11, 11'), the cleaning signals (11, 11') being associated to a hand-cleaning event, the system further comprising a wearable device (15) to be worn by a user of the system, the wearable device (15) being configured to generate a virtual environment (16) visible to the user, a plurality of indicators (26, 27, 28, 45) related to the cleaning signals (11, 11') being displayed in the virtual environment (16).

14 Claims, 12 Drawing Sheets

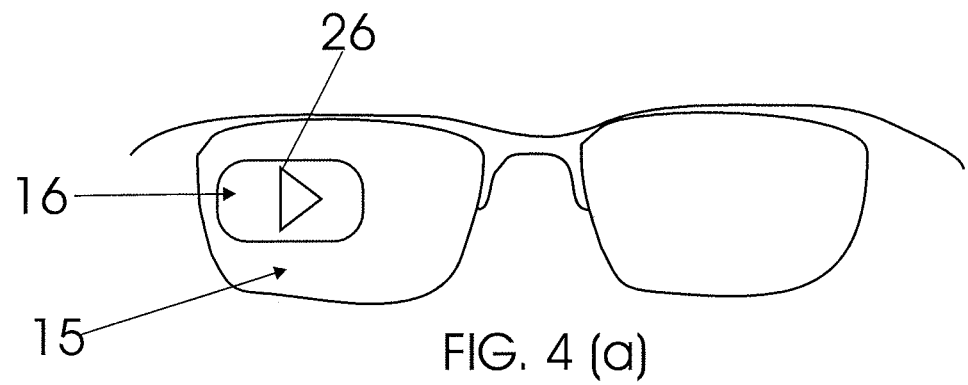
FIG. 4 (a)
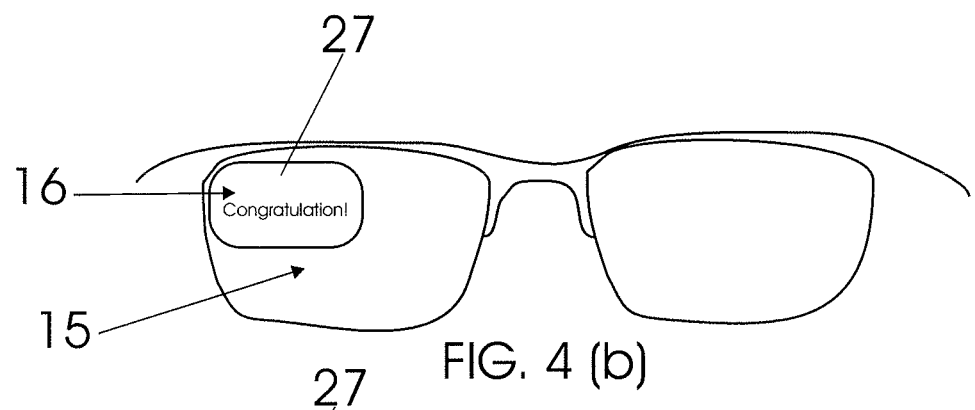
FIG. 4 (b)
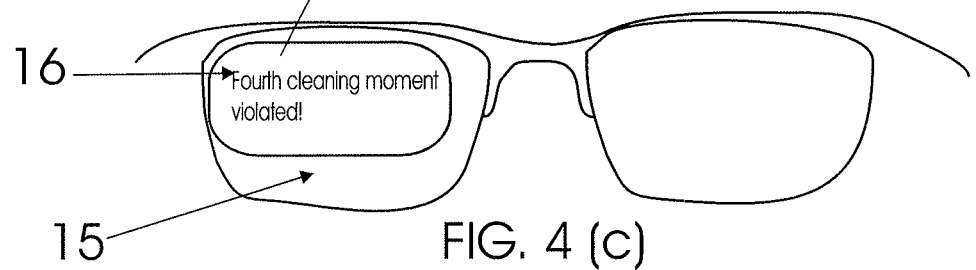
FIG. 4 (c)
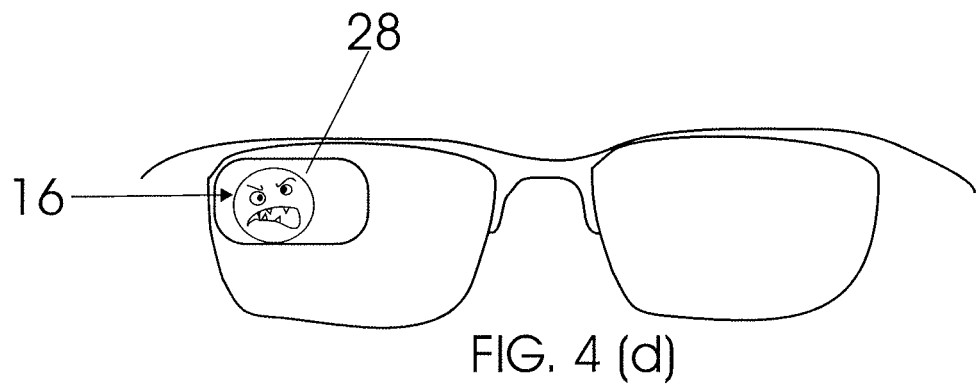
FIG. 4 (d)
FIG. 4

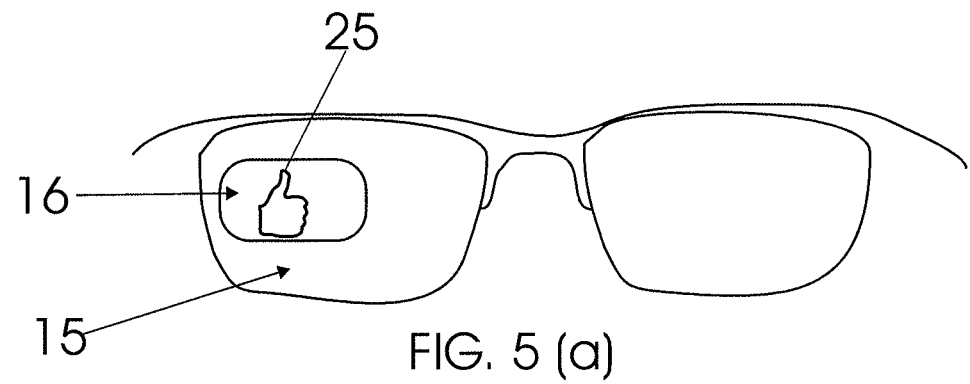
FIG. 5 (a)
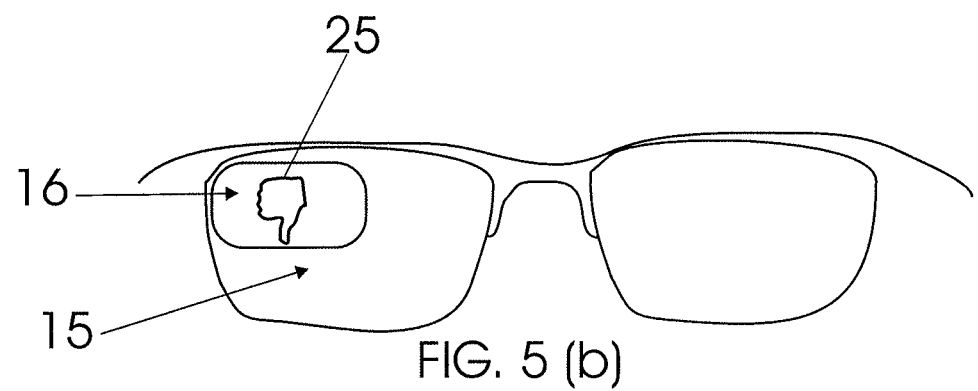
FIG. 5 (b)
FIG. 5

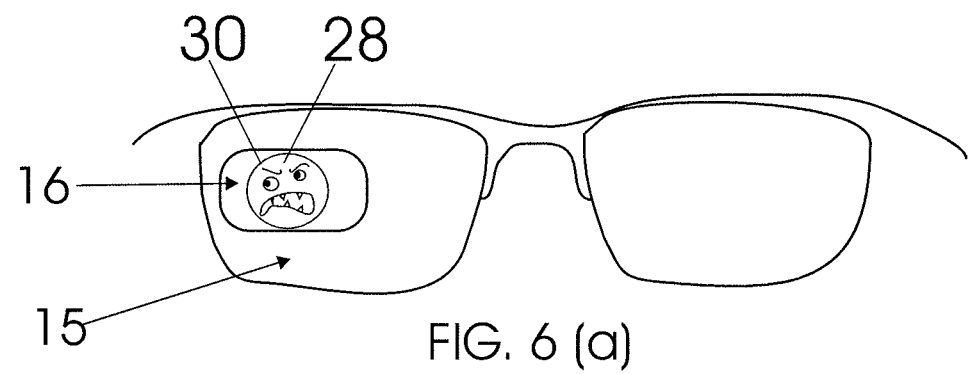
FIG. 6 (a)
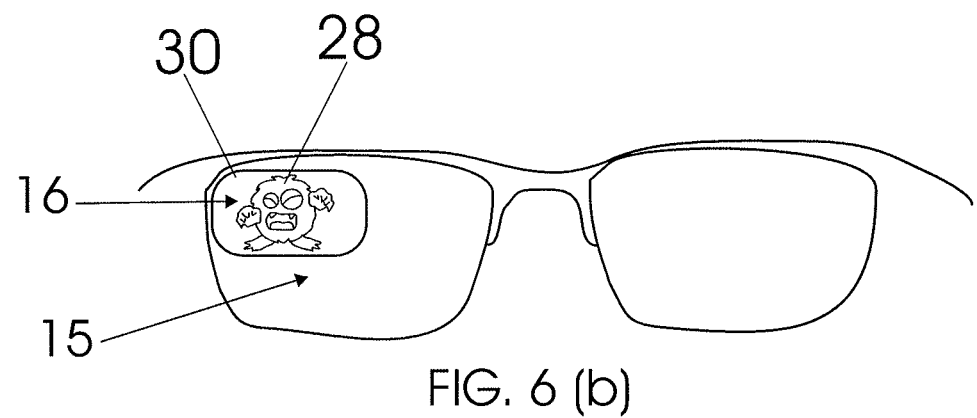
FIG. 6 (b)
FIG. 6

| 46 | Dr.xxxxxxxx |
|---|---|
| January | 40% |
| February | 48% |
| March | 55% |
| April | 60% |
| May | 60% |
| June | 68% |
| July | 65% |
| August | 70% |
| September | 75% |
| October | 75% |
| November | 85% |
| December | 85% |

FIG.11

SYSTEM AND METHOD FOR MONITORING THE HAND-CLEANING PRACTICES IN A HOSPITAL ENVIRONMENT, AND A WEARABLE DEVICE TO BE WORN BY A USER IN A HOSPITAL ENVIRONMENT

The present invention relates to a system and to a method for monitoring hand-cleaning practices in a hospital environment. More specifically, the present invention relates to a system and to a method suitable for generating a virtual environment in a device for a user to dress in a hospital environment. The invention also relates to a wearable device for a user of a hospital environment. The teachings of the present invention can be further applied for training people in practices of cleaning their hands in a hospital environment.

DESCRIPTION OF THE PRIOR ART

Cleaning one's hands is one of the most important procedures to prevent hospital infections. Dispensers comprising alcohol-gel most of the time are arranged at various points of a hospital, so that patients, visitors, co-workers and health professionals can clean their hands a number of times along the day.

Thus, the investment and the development of new methods and systems for monitoring cleaning practices in hospital environments are constant. Additionally, following technological advances, more and more equipment and accessories are employed to provide support to the systems used.

Among the systems known from the prior art, one cites the system disclosed in document US 2004/0090333. In this case, a plurality of sensors (radiofrequency (RF) or infrared) are arranged in a hospital Ward and have the objective of monitoring the displacement of a determined doctor.

Such a system has, as a negative point, the fact of being totally dependent on the use of a name tag on the part of the doctor. In other words, in US 2004/0090333 the name tag for identifying the doctor communicates with sensors arranged in various environments (equipment, taps, among others), so that, if the medical professional is not wearing his name tag, the system will not operate.

A few systems known from the prior art are configured so as to emit an alert signal to a doctor, thus indicating that the later should carry out a cleaning action. However, most of such alert signals are configured as lights or vibrating alerts, which effectively do not call attention of the medical professional.

In other words, such alert signals are not sufficient to motivate a doctor to perform an action of cleaning his hands, so that a doctor often does not even notice that a light alert vibrating alert has been sent to him.

Additionally, the prior art discloses systems that make use of determined accessories that help the doctor to keep the procedure of cleaning his hands and also aid in improving the interaction between doctor and patient.

For example, document US 2015/0287182 discloses the use of smart glasses capable of detecting touches on a given surface, so as to generate a graph that represents a "contamination way". It is further mentioned that each doctor, visitor and hospital equipment will have an associated identification number.

The focus of the teachings of US 2015/0287182 lies effectively in the generation of the so-called "contamination way", so that this document does not approach specifically means for monitoring and encouraging the practice of cleaning one's hands, which is the focus of the present invention.

The prior art further discloses systems that make use of smart glasses to potentiate the interaction between doctor and patient in a medical consultation, for instance, providing information about the patient and providing a checklist that is visible to the doctor. Such characteristics, even if interesting to the medical area, do not potentiate at all the practices of cleaning one's hands and, as a result, do not contribute at all to a reduction of the occurrences of contaminations.

Thus, it is known that the use of smart glasses in the medical area is in evolution, but so far no system is known to make use of this type of accessory and that effectively aids in monitoring and encouraging the cleaning practices.

The present invention aims at overcoming the problems existing in the prior art and proposes a system and a method of monitoring the practice of cleaning one's hands in a hospital environment.

The present invention overcomes the problems related to "name-tag dependence" by using infrared sensors (infrared cameras) that detect the heat emitted by a person and, as a result, can track the displacement of such a person in a hospital environment.

Additionally, and in conjunction with infrared sensors, the system proposed in the present invention also uses contact sensors and movement sensors, with a view to detect, respectively, touches made by the medical professional on a given surface, as well as the handling of devices that potentially cause infections, as for example, catheters.

Thus, the whole movement and actions performed by a doctor in a hospital environment will be monitored by the system proposed in the present invention.

With a view to effectively alert the medical professional to keep the practice of cleaning his hands, the system makes use of a device wearable by the user and that is capable of reproducing a virtual environment, such a virtual environment reproducing the plurality of indicators relating to keeping the practice of cleaning one's hands.

Among such indicators, the present invention discloses an indicator related to the virtual representation of an infectious agent, such a virtual representation being displayed directly in the doctor's visual field. In this way, if the doctor fails to perform the cleaning action, a virtual representation will be indicated to the doctor and the later will be motivated to clean his hands. It is pointed out that the reference to a doctor should not be considered a limitation of the present invention. Obviously, the teachings of the present invention can be applied to male nurses, physiotherapists or any other professional of the health area.

Unlike vibrating indications and light indications (green/read) known from the prior art and that attract little attention of the doctor (health professional), the virtual representation of a bacterium passes to the doctor (health profession) the idea that a contamination is taking place. In this way the professional is immediately motivated to perform the action of cleaning his hands.

Thus, by using a set of sensors and a device wearable by the user, the present invention proposes a system and a method for monitoring the practice of cleaning one's hands in a hospital environment that overcome the problems known from the prior art.

Finally, it is pointed out that the teachings of the present invention can be applied in conjunction with the matter disclosed in applications BR 10 2016 027362-5 e BR 10 2014 027568-1, belonging to the same applicants.

OBJECTIVES OF THE INVENTION

The present invention has also the objective of providing a system for monitoring the practice of cleaning one's hands in a hospital environment.

An additional objective of the present invention is to provide a system that makes use of a plurality of sensors to monitor the movement of a doctor (health professional) within a hospital environment, the touches carried out by the doctor on a given surface and the handling of invasive devices by the doctor.

The present invention has also the objective of providing a system for monitoring the practice of cleaning one's hands in a hospital environment that is capable of operating, even if the doctor is not using a name-tag.

An additional objective of the present invention is to provide a system for monitoring the practice of cleaning one's hands in a hospital environment that further comprises a device wearable by a user, said wearable device being configured to generate a virtual environment visible by the user, wherein a plurality of indicators related to the action of cleaning one's hands can be displayed in the virtual environment.

The present invention has also the objective of providing a system for monitoring the practice of cleaning one's hands in a hospital environment, capable of generating a virtual representation of an infectious agent, the virtual representation of the infectious agent being a transitory representation.

An additional objective of the present invention is to provide a system for monitoring the practice of cleaning one's hands in a hospital environment, capable of being used in training professionals in the health area.

The present invention has also the objective of providing a method for monitoring the practice of cleaning one's hands in a hospital environment, said method being in harmony with the monitoring system proposed in the present invention.

It is also an objective of the present invention to provide a device wearable by a user of a hospital environment, the wearable device being configured to generate a virtual representation of an infectious agent in a virtual environment of the wearable device, said virtual representation being configured as a transitory representation between a first state and a second state.

BRIEF DESCRIPTION OF THE INVENTION

The objectives of the present invention are achieved by means of a system for monitoring the practices of cleaning one's hands in a hospital environment, the system comprising a set of sensors configured as at least one from: at least one infrared sensor establishing a heat detection zone, at least one from contact sensor and movement sensor associated to at least one article of the hospital environment, at least one sensor for actuating an antiseptic substance dispenser.

The set of sensors is configured to generate a plurality of cleaning action signals, the cleaning signals being associated to a hand cleaning event, wherein the system further comprises a device wearable by a user of the system, wherein the wearable device is configured to generate a virtual environment visible by the user, wherein a plurality of indicators related to the cleaning signals are displayed in the virtual environment.

The present invention further describes a method for monitoring the practices of cleaning one's hands in a hospital environment, the hospital environment comprising a set of sensors configured as at least one infrared sensor, one sensor contact, one movement sensor and one sensor for actuating an aseptic substance dispenser.

The method comprises the steps of: generating a plurality of cleaning signals from data obtained from the set of sensors, generating a virtual environment on a device wearable by a user, wherein the virtual environment is visible by the user, and exhibiting a plurality of indicators in the virtual environment, wherein the plurality of indicators are related to cleaning signals.

The objectives of the present invention are further achieved by means of a device wearable by a user of a hospital environment, the wearable device configured to generate a virtual environment visible by the user, wherein the plurality of indicators related to at least one cleaning event are exhibited in the virtual environment.

The wearable device is further configured to generate a virtual representation of an infectious agent, the virtual representation configured as a transitory representation between a first state and a second state, wherein the infectious agent is visible to the user and in the second state the virtual representation of the infectious agent is not visible to the user.

BRIEF DESCRIPTION OF THE DRAWINGS

The present invention will now be described in greater detail with reference to an example of embodiment represented in the drawings. The figures show:

FIG. 4 is a preferred representation of the virtual environment generated on the wearable device that integrates the system proposed in the present invention, wherein FIG. 4(a) illustrates an indicator in video element, FIGS. 4(b) and 4(c) illustrate an indicator of text element and FIG. 4(d) illustrates an indicator in ludic element;

FIG. 5 is an additional representation of the virtual environment generated on the wearable device that integrates the system proposed in the present invention, wherein FIGS. 5(a) and 5(b) illustrate indicators on graphic elements;

FIG. 6 shows additional representations of the virtual environment on the wearable device that integrates the system proposed in the present invention, wherein FIGS. 6(a) and 6(b) illustrate indicators in ludic elements;

FIG. 11 is a representation of a cleaning history obtained by monitoring the practices of cleaning one's hands proposed in the present invention;

DETAILED DESCRIPTION OF THE FIGURES

Figure 1:
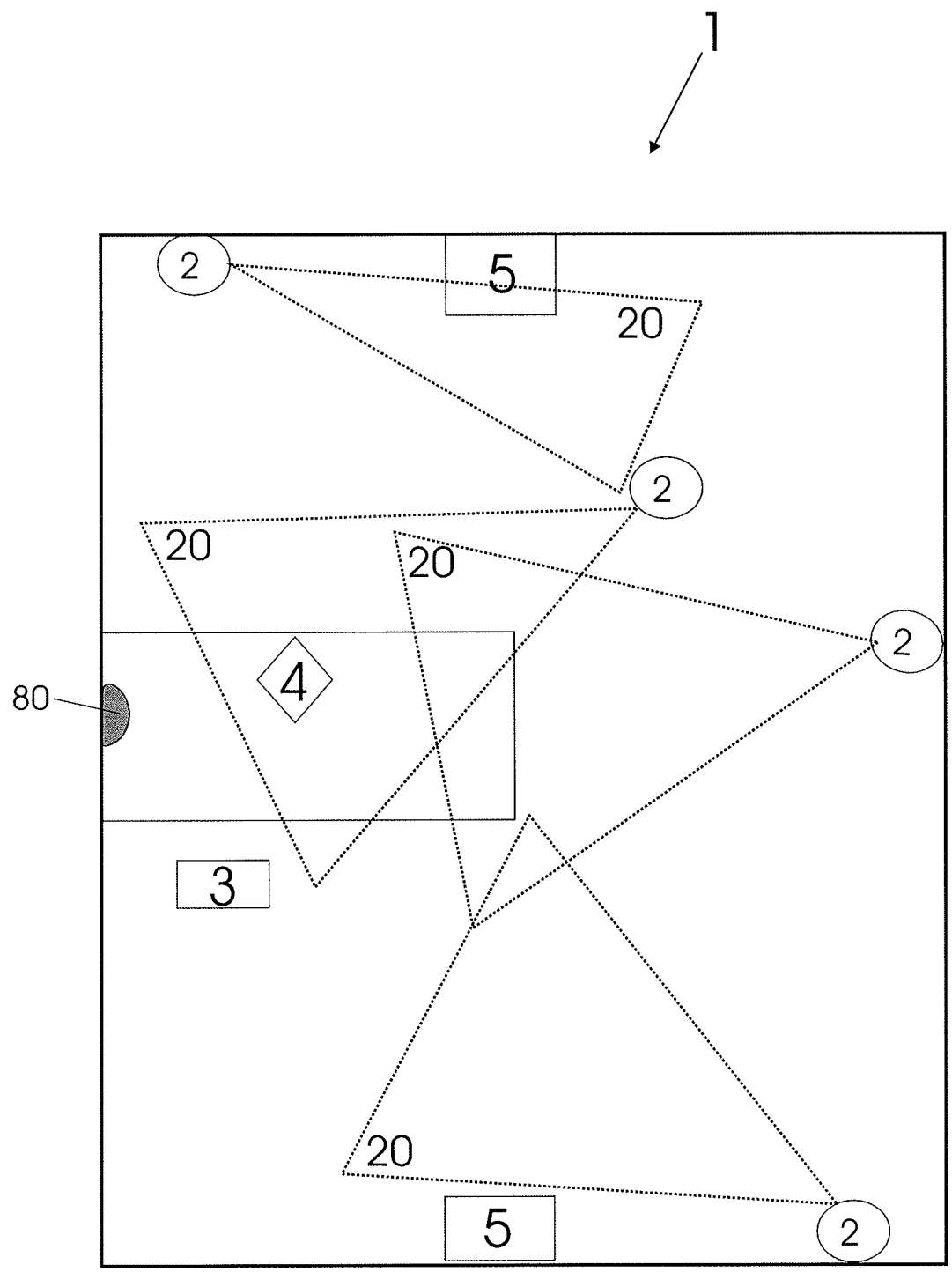
FIG. 1 is a representation of the system for monitoring the practices of cleaning one's hands in a hospital environment proposed in the present invention.

A preferred representation of the system for monitoring the hand cleaning practices in a hospital environment 1 (called also system 1) will be described in conjunction with the representation of FIGS. 1 to 10.

Initially one points out that in this preferred representation of the system 1 the hospital environment should be preferably understood as a hospital ward. Anyway, it is pointed out that such a description should not be considered a limiting characteristic of the present invention, so that the teachings proposed herein are also applied to other hospital environment.

By way of example, said hospital environment may be regarded not only as a hospital Ward, but also as any internal area (corridors, bathrooms, waiting rooms, surgical centers, among others).

Further, the reference to a hospital also represents only a preferred characteristic of the present invention, so that the teachings proposed herein are also applicable to other health units, such as treatment unit, follow-up unit, rest units, and emergency units in which a patient can be accommodated, be it for long or short periods of time.

In a generic way, the reference to a hospital environment should be understood as any place suitable for receiving a patient.

In specific reference to FIGS. 1-3 and 8-10, the system 1 proposed in the present invention comprises a set of sensors 2, 3, 4 and 5 arranged inside the hospital environment.

Preferably, the system 1 comprises a plurality of infrared sensors 2 arranged in the hospital environment, each of these sensors establishing a heat detection zone 20.

Such infrared sensors 2 are configured to detect the heat emitted by persons or pieces of equipment (pumps, monitors, television sets, among others) arranged in the hospital environment. Said sensors 2, preferably configured as an infrared chamber, generate an image pattern such as a heat map, which enables one to identify the movement of a person within the environment, as well as whether this person is lying on the bed of the hospital ward.

Preferably, the infrared sensors 2 should be arranged at the ceiling of the hospital environment and so that the whole area of the environment can be captured by the heat detection zone 20 of each of the sensors 2. Alternatively, the arrangement of the sensors on the walls of the hospital environment is fully acceptable.

The heat detection zone 20 should be understood as being an area for detecting the heat of the infrared sensor 2, that is, the area in which the sensor 2 is capable of detecting the heat emitted by a determined person or equipment.

Figure 3:
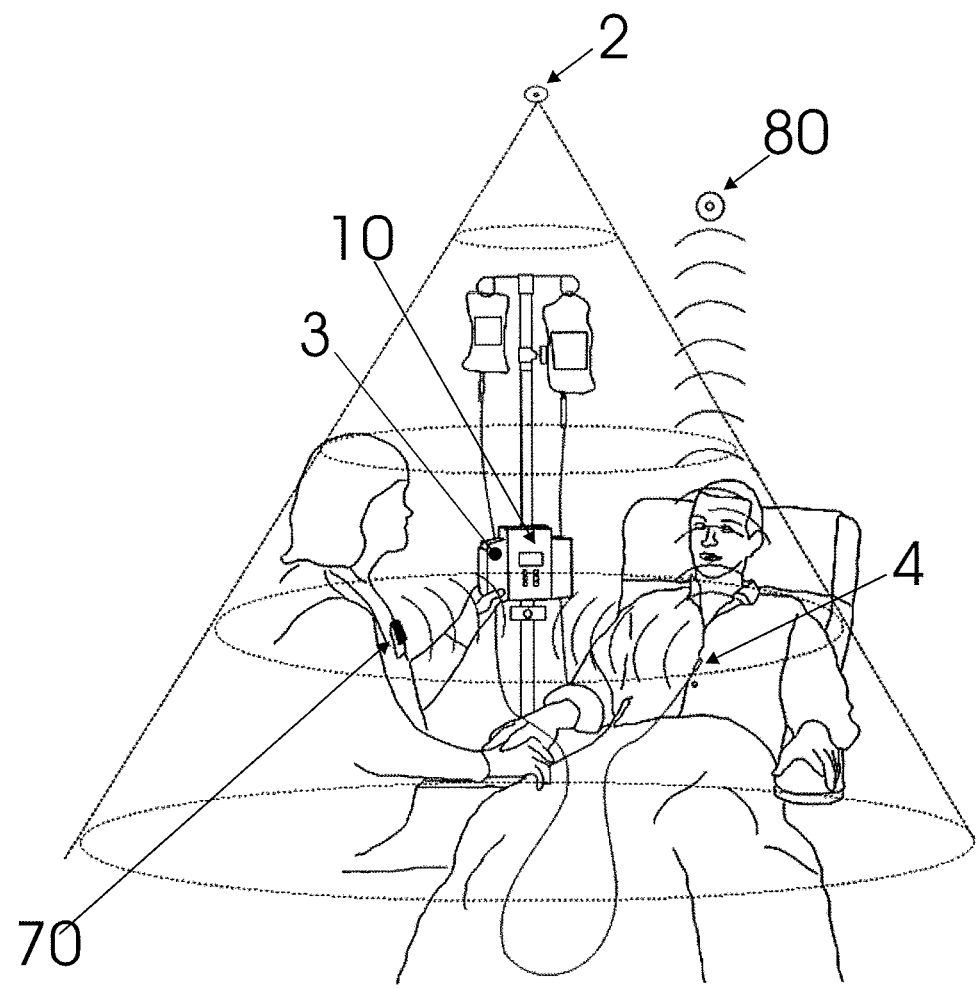
FIG. 3 is a perspective view of a hospital environment comprising a few sensors used in the system proposed in the present invention.

Said heat detection area 20 may be calibrated according to an infrared sensor 2 used. Additionally the manner in which the heat detection zone 20 is illustrated in FIGS. 1 and 3 should not be considered a limitation of the present invention.

The use of the infrared sensors 2 provides advantages to track a determined person or equipment within the hospital environment. For instance, by using such sensors (infrared cameras), can track an individual, even if his is not used a name-tag provided with a radiofrequency sensor (RF sensor).

For example, it is known that some systems proposed in the prior art present the so-called "name-tag dependence"), that it, such systems will only operate properly if the person (doctor, visitor, nurses, physiotherapists or any other professional of the health area) is wearing a name-tag. Otherwise, the tracking will not be possible, and the system will operate inadequately.

Similarmente, o estado da técnica revela sistemas em que etiquetas de identificação (dotadas de sensores de radiofrequência) são dispostas em equipamentos, de modo a avaliar quando tais equipamentos foram tocados. Tal como comentado acima, caso tais etiquetas não estejam presentes nos equipamentos e o médico não esteja utilizando seu crachá de identificação, não será possível detectar quando estes foram tocados.

Such drawbacks do not take place in the system 1 proposed herein, since the tracking is obtained from the heat emitted by the human body or by a determined piece of equipment. In this way, tracking can be made even if the person and the equipment are not using the name-tag and the identification-tag.

Preferably, the infrared sensors 2 used in the system proposed in the present invention have the characteristics of the infrared sensors used in patent application BR 10 2014 027568-1, belonging to the same applicants, the description of which is incorporated herein by reference.

Figure 8:
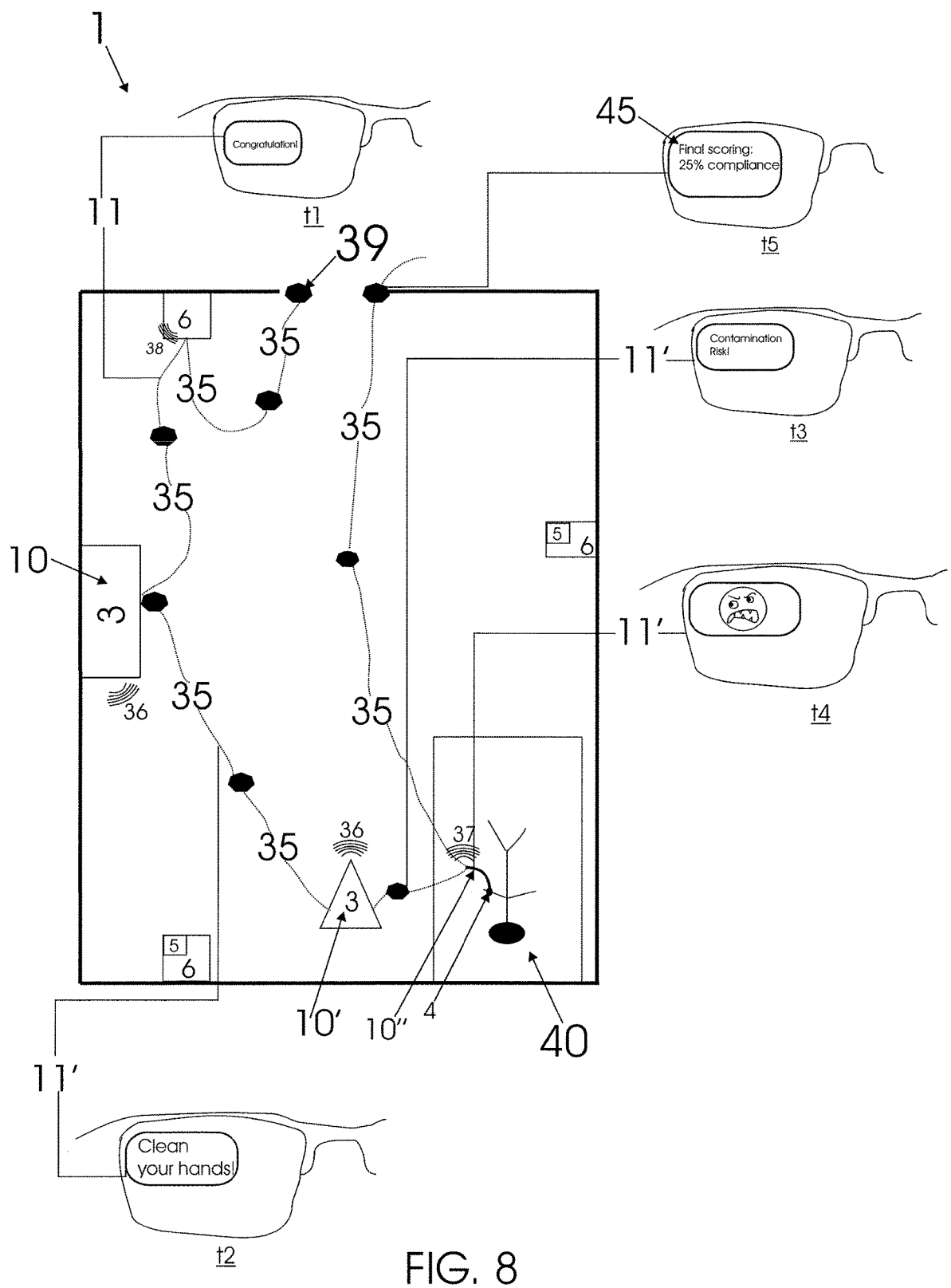
FIG. 8 is a representation of the virtual environment generated on the wearable device that integrates the system proposed in the present invention, considering data of displacement from the infrared sensors, contact data from the contact sensors, movement data from the movement sensors and actuation data from the aseptic substance dispenser.
Figure 9:
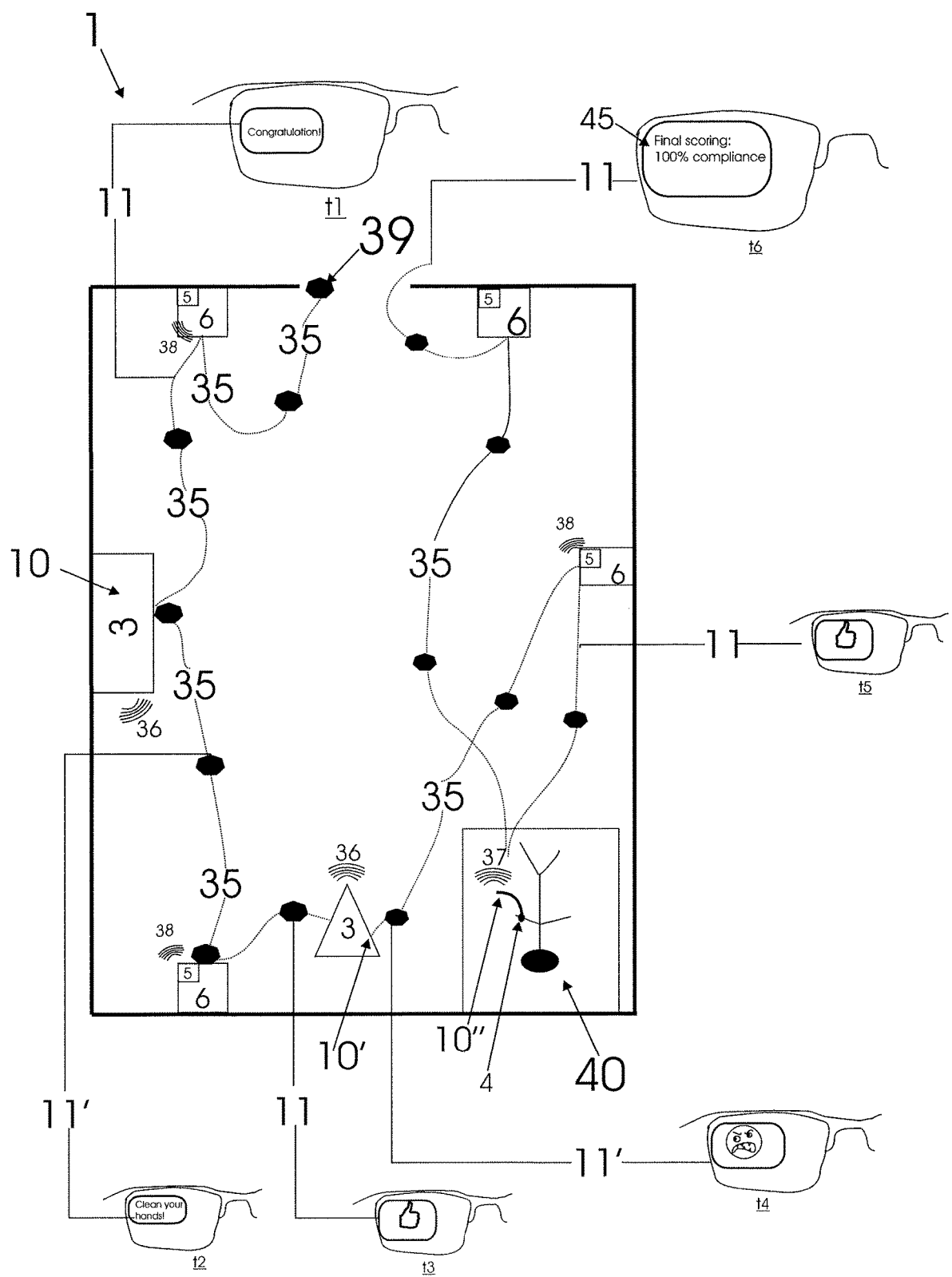
FIG. 9 is an additional representation of the virtual environment generated on the wearable device that integrates the system proposed in the present invention, considering displacement data from the infrared sensors, contact data from the contact sensors, movement data from the movement sensors and actuation data from the actuation aseptic substance dispenser.

In addition to the infrared sensors 2, the system 1 proposed in the present invention further comprises a movement sensor 4 associated to an article 10 of the hospital environment, as shown in FIGS. 3, 8, and 9. In a merely preferred way and without entailing any limitation to the protection scope of the present invention, the movement sensor 4 should be understood as the set of an accelerometer and gyroscope.

Specifically, the movement sensor 4 should be arranged on an invasive device, such as a catheter, so that it will be possible to determine the moment when said invasive device was handled by a medical professional.

The reference to a catheter should not be understood as a limiting characteristic of the present invention. In general, the movement sensor 4 may be arranged on any invasive device, that is, on a central catheter, a vesical probe, a tracheotomy, an orthotracheal tube, among others. It is pointed out that the reference to an invasive device should be understood as any device that causes break of the natural barriers or penetrates cavities of the organism, enabling access to the inner medium of the cardiovascular system, of the respiratory system, of the urinary system, or any other system of the human body.

Preferably, the movement sensors 4 used in the system proposed in the present invention have the characteristics of the movement sensors described in patent application BR 10 2014 027568-1, belonging to the same applicants, the description of which is incorporated herein by reference.

In addition to the infrared sensors 2 and to the movement sensors 4 discussed before, the system 1 proposed in the present invention further comprises an actuation sensor 5 of an aseptic substance dispenser 6, as shown in FIGS. 7, 8, 9, and 10.

The aseptic substance dispenser 6 is preferably configured as an alcohol-gel dispenser, these pieces of equipment being arranged usually inside hospital wards, so that medical professionals, patients and visitors can clean their hands. Obviously, the reference to alcohol-gel should not be regarded as a limitation of the invention, so that any antiseptic substance suitable to be arranged inside a dispenser might be used, as for example, soap or chlorhexidine.

The actuation sensor 5 should be understood as any sensor capable of detecting that a cleaning action has taken place, that is, a sensor capable of detecting that the aseptic substance dispenser 6 has been used.

Preferably, the actuation sensors 5 and the aseptic substance dispenser 6 used in the system proposed in the present invention have the characteristics of the sensors and dispensers described in patent application BR 10 2014 027568-1, belonging to the same applicants, the description of which is incorporated herein by reference.

Figure 2:
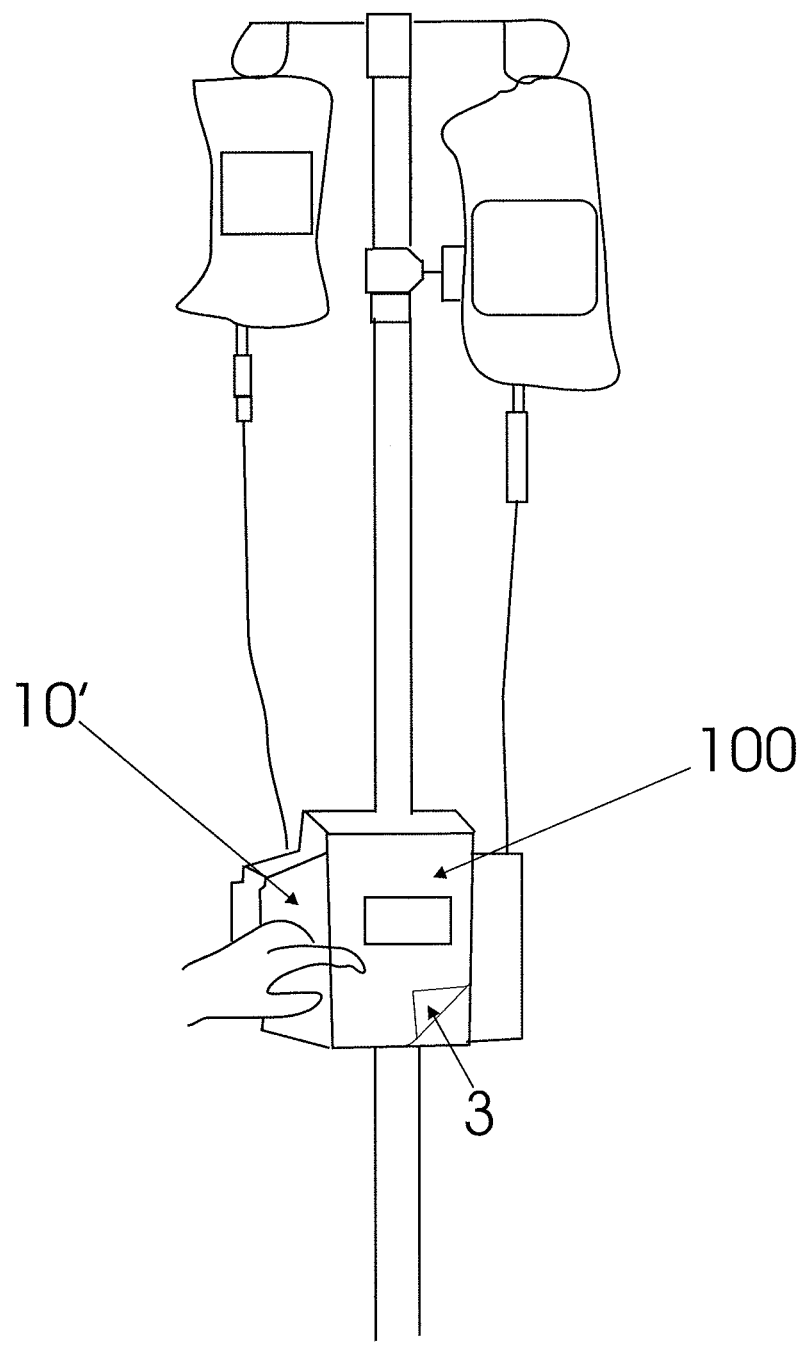
FIG. 2 is a preferred representation of an article of the hospital environment that comprises one of the sensors used in the system proposed in the present invention.

In addition to the infrared sensors 2, movement sensor 4 and actuation sensor 5, the system 1 proposed in the present invention further makes use of a contact sensor 3 associated to at least one article 110' arranged in the hospital environment, as preferably viewed in FIG. 2.

The contact sensor 3 is preferably configured as a film provided with a plurality of (capacitive or resistive) sensors and is associated to a surface of the article 10'.

Such sensors are capable of detecting the occurrence of a touch on the surface of the article 10' on which the contact sensor 3 is arranged. For instance, with reference to FIGS. 2 and 3, the arrangement of the contact sensor 3 on a first surface 100 of an infusion pump enables one to detect when the medical professional touched the surface 100 of said pump.

It is pointed out that the description of the article 10' as an infusion pump should be considered only a preferred characteristic of the present invention, in alternative embodiments. The contact sensor 3 might be arranged on any other article 10' arranged in the hospital environment, such as monitors, pieces of furniture and decoration, switches, taps, or any other equipment on which one desires to verify the occurrence of contact.

Preferably, the contact sensors 3 used in the system proposed in the present invention have the characteristics of the contact sensors described in application, BR 10 2016 027362-5, belonging to the same applicants, the description of which is incorporated herein by reference.

The use of the infrared sensors 2, contact sensors 3, movement sensors 4 and actuation sensors 5 enables the actions performed by a medical professional within the hospital environment to be tracked and, as a result, enables evaluation of their practice of cleaning their hands.

For instance, due to the infrared sensors 2, it will be possible to track the movement of the medical professional inside the hospital environment. On the other hand, the contact sensor 3 enables one to evaluate whether a determined piece of equipment has been touched, and the movement sensor 4 enables one to determine if an invasive device has been handled.

As discussed before, and starting from the use of the infrared sensors 2 in conjunction with the other sensors of the system, the monitoring of the practices of cleaning one's hands is enabled even if the doctor/visitor is not wearing a name-tag (provided with a sensor, for example, a radiofrequency one). In this case (no name-tag used), it will be possible to monitor the hand cleaning practices and possible violations of such practices, but it will not be possible to determine who is being monitoring and who has violated such practices.

In order to identify the medical professional monitored by the system, the latter should be wearing a name-tag 70, provided with a radiofrequency sensor, for example (as shown in FIG. 3). Additionally, the other sensors 1 (infrared 2, contact 3, movement 4 and actuation 5) should also have a radiofrequency module associated to each of them, so that the communication with the radiofrequency sensor on the name-tag can be possible.

The data detected by such sensors, as well as the combination thereof, enable one to evaluate the practices of cleaning one's hands according to a standard previously established by a health institution.

For instance, with the system 1 proposed in the present invention, one can evaluate whether the cleaning practices are in conformity with the so-called "Five Moments for Cleaning one's Hands", that is, the five moments at which one should clean one's hands within a hospital environment.

The table below indicates these moments and why one should perform the action of cleaning one's hands:

| Five Moments for Cleaning one's Hands | Why? |
| --- | --- |
| 1 - Before contact with the patient | For protection of the patient, preventing transmission of microorganisms present on the hands of the professional and that may cause infections. |
| 2 - Before carrying out the aseptic procedure | For protection of the patient, preventing transmission of microorganisms on the hands of the professional to the patient, including microorganisms of the patient himself. |
| 3 - After risk of exposure to body fluids | For protection of the professional and of the health care environment immediately close to the patient, preventing transmission of microorganisms from the patient to other professionals or patients. |
| 4 - After contact with the patient | For protection of the professional and of the health care environment, including the surfaces and the objects close to the patient, preventing transmission of microorganisms from the patient himself. |
| 5 - After contact with areas close to the patient | For protection of the professional and of the health care environment, including surfaces and objects immediately close to the patient, preventing transmission of microorganisms from the patient to other professionals or patients. |

For this purpose, and as will be discussed later, the system 1 proposed in the present invention establishes a plurality of cleaning signals 11 and 11', wherein such cleaning signals 11, 11' are associated to an event of cleaning one's hands.

By cleaning event one should understand an opportunity when the medical professional had to clean his hands and failed to do so (considering a determined cleaning protocol of an institution) or a duly performed cleaning action.

For example, a cleaning opportunity may be regarded as one of the five cleaning moments mentioned above, at which the medical professional should have cleaned his hands.

Thus, and generally speaking, the reference to a cleaning event in the present invention should be understood as a cleaning action already performed or a cleaning action that should have taken place, but did not occur (cleaning opportunity).

In this way, associating the cleaning events to the cleaning events 11 and 11', the system 1 establishes a first cleaning signal 11 related to the act of having cleaned one's hands. Whenever a cleaning action takes place (actuation sensor 5 has been actuated), a first cleaning signal 11 is generated by the system 1 proposed in the present invention.

Similarly, from the information captured by the set of sensors 2, 3, 4, and 5, the system 1 establishes a second cleaning signal 11' related to an opportunity of cleaning one's hands.

An important characteristic of the system 1 proposed in the present invention lies in the fact that the first and the second cleaning signals 11, 11' are indicated to the medical professional on a wearable device 15 of the latter.

By "wearable device" 15 one understands any device that can be worn by the medical professional that that is capable of reproducing video, audio, image files, be connected to the Internet, such as a wrist-watch or glasses. In this preferred embodiment of the system 1 and with reference to FIG. 4, the wearable device 15 should be understood preferably as a pair of glasses worn by the medical professional, this device also providing protection to the person who wears it, thus acting as Equipment of Individual Protection (EIP/EPI). More specifically, said wearable device 15 should preferably be configured as smart glasses, like the models used at present: Google glass, HoloLens (Microsoft), and still the models from Vuzix, Epson, Sony, among others. Obviously, the use of these models is a non-limiting characteristic of the present invention. Alternatively, any other model of smart glass might be used.

It is known that such devices are provided with a number of functionalities and characteristics, such as the possibility of connection to the world computer network, the use of video cameras to record the environment around the device, interaction screens, among others.

Thus, the present invention proposes the use of a set of sensors 2, 3, 4, and 5 together with the wearable device 15 with a view to monitor and encourage the practices of cleaning one's hands in a hospital environment.

More specifically and with reference to FIG. 4, the wearable device 15 is configured to generate a virtual environment visible to the user (medical professional) of the system 1, wherein a plurality of indicators 25, 26, 27, 28 related to the first and the second cleaning signals 11 and 11' are displayed in the virtual environment 16.

By "virtual environment 16" one should understand the representation in augmented reality in a determined area of the lens of the wearable device 15. The representation of the virtual environment 16 in augmented reality enables the medical professional to continue to performing his duties within the hospital environment, but still enables determined information to be supplied to the professional through a plurality of indicators.

More specifically, and only preferably, the plurality of indicators is configured as at least one from: a video element 26 (FIG. 4(a)), a text element 27 (FIGS. 4(b) and 4(c)) and a ludic element 28 (FIG. 4(d)).

Each of these indicators has the objective of acting as an alert to the medical professional calling attention to a cleaning action that has taken place (first cleaning signal 11) or to an opportunity to clean one's hands (second cleaning signal 11').

More specifically with reference to FIG. 4 (b), the representation by means of a text indicator 27 may alert the medical professional, for example, to a correctly performed cleaning action. Thus, the representation in augmented reality of the text "Congratulation" may be indicated in the virtual environment 16.

Such a representation may be indicated on the wearable device 15, since the infrared sensors 2 and the actuation sensors 5 detect that a correct cleaning action has been performed before contact of the doctor with the patient (first cleaning moment).

Similarly and with reference to FIG. 4 (c), the infrared sensors 2 and the actuation sensors 5 can indicate that after contact with the patient a cleaning action should have taken place, but was not detected, that is, a cleaning opportunity took place. Thus, the indicator 27 related to a second cleaning signal 11' will be displayed in the virtual environment 16, for example, with the indication "fourth cleaning moment violated!"

It is pointed out that the fourth cleaning moment refers to a cleaning action that should have taken place after contact with the patient, as already indicated before.

The representation through the text element 27 may be replaced by the indication via a graphic element (image) 25, as shown in FIGS. 5(a) and 5(b). Obviously, the text 27 and graphic 25 element indicated in the figures in question should be considered only preferred embodiments of the present invention.

In addition to the use of graphic 25 and text 27 elements, the system 1 of the present invention further enables the generation of the virtual environment 16 and the use of a ludic element 28 related to the first 11 and the second 11' cleaning signals.

With reference to FIG. 6, one observes that in the system 1 proposed in the present invention the ludic element 28 is configured as a virtual representation of an infectious agent 30, that is, the ludic element 28 is configured as a virtual representation of a bacterium. FIG. 6(a) illustrates the virtual representation of the bacterium called *Staphylococcus* and FIG. 6(b) illustrates the virtual representation of the bacterium called Enterobacteriaceae.

Figure 7:
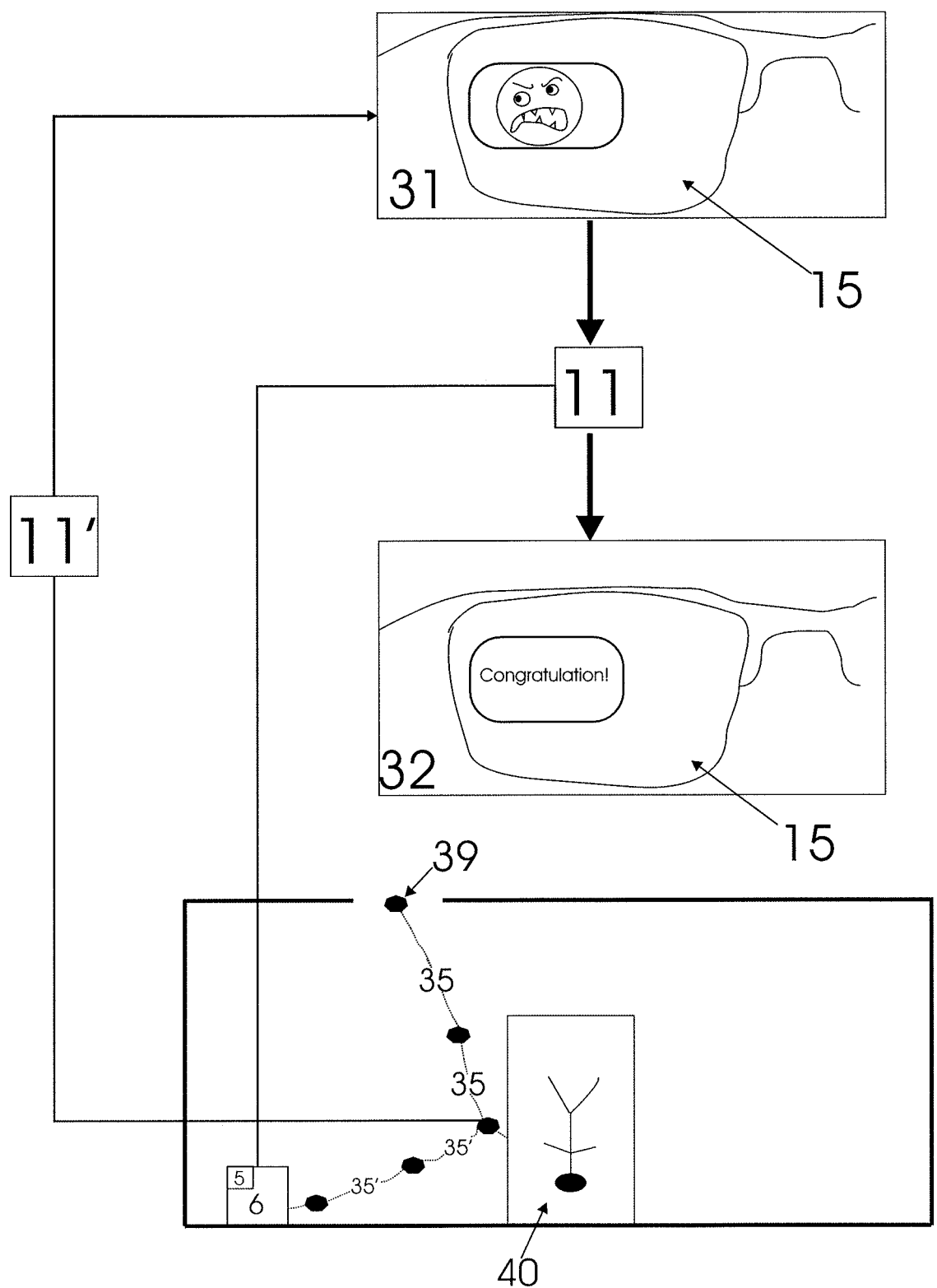
FIG. 7 is a representation of the virtual environment generated on the wearable device that integrates the system proposed in the present invention, indicating the transition of the virtual representation of the infectious agent between a first state and a second state and further considering data of displacement carried out by a doctor in a hospital environment.

With additional reference to FIG. 7, the system 1 proposed in the present invention presents, as an additional characteristic, the fact that the virtual representation of the infectious agent 30 is a transitory representation.

In a more specific way, the virtual representation of the infectious agent 30 is transitory between a first state 31 and a second state 32, wherein the first state 31 is associated to the second cleaning signal 11' (cleaning opportunity) and the second state 32 is associated to the first cleaning signal (cleaning action has taken place).

In other words, the virtual representation of the infectious agent 30 in its first state 31 is related to an opportunity of cleaning one's hands, since the virtual representation of the infectious agent 30 in its second state 32 is related to a cleaning action properly performed.

Additionally and further with reference to FIG. 7, one understands that in the first state 31 the virtual representation of the infectious agent 30 is visible to the user through the wearable device 15. On the other hand, in the second state 32 the virtual representation of the infectious agent 30 is not visible to the user through the virtual environment 16.

Thus, one considers a medical professional 39 the one who goes into a hospital environment, such as a hospital Ward, to carry out a determined treatment on a patient 40. One further considers that the infrared sensors 2 (not shown in FIG. 7) detect determined displacement data 35 of the medical professional 39 as the displacement indicated by means of dashed lines in FIG. 7.

One observes that the displacement data 35 indicates that the displacement of the medical professional was made directly toward the bed of the patient 40 and that, as a result, the aseptic substance dispenser 6 was not actuated, that is, a cleaning opportunity took place and the first cleaning moment (before contact with the patient) was violated.

In this regard, the violation of the first cleaning moment will be indicated on the wearable device 15 through the virtual representation of an infectious agent 30 visible to the user via augmented reality. The indication of the ludic element 28 by means of an infectious agent 30 in the virtual environment 16 will be visible to the doctor 39.

Consequently, the medical professional 39 will be alerted to the fact that a cleaning action should have taken place, but failed to do so. And through indication of the infectious agent 30 directly in his visual field (via augmented reality), the medical professional 39 will be aware that failure to clean his hands may cause infections to the patient. In this way, the doctor 39 is motivated to clean his hands and, as a result, reduce the chances of proliferation of bacteria.

Thus, and directly motivated by the indication of the infectious agent 30, the medical professional will be motivated to move to the alcohol-gel dispenser 6 and perform a hand cleaning action. In this way, new displacement data will detected by the infrared sensors 2 representing the movement of the doctor 39 as far as the alcohol-gel dispenser 6.

The actuation of the dispenser 6 will be duly confirmed through the actuation sensor 5, indicating that a cleaning action has taken place. In this way, and from generation of the first cleaning signal 11, the virtual representation of the infectious agent 30 will reach its second state 32, that is, the state in which such a representation is not visible to the medical professional.

Once the cleaning action has been performed, one may arrange an indicator in the virtual environment 16 related to the performance of the cleaning action, as for example, the text element 27, indicating via augmented reality the word "Congratulation" to the medical professional 39.

Thus, by using the wearable device 15 one has an easily perceptible indication to the user that the cleaning protocol has been violated. So the representation in the virtual environment 16 directly in the visual field of the doctor reduces potentially the chances that such an alert will be merely disregarded by the professional 39, and the latter follows the medical procedures without correctly cleaning his hands.

Moreover, and by using the set of sensors 2, 3, 4 and 5 one can track the displacement of the doctor 39, as well as the handling of invasive devices and contact with determined surfaces.

Thus, and with reference to FIG. 8, one considers a certain frequency of actions performed by a medical professional 39 in a determined hospital environment. Said hospital environment comprises aseptic substance dispensers 6, a first article 10 configured as a monitor, a second article 10' configured as an infusion pump and a third article 10" configured as an invasive device, such as a catheter.

With a view to detect possible touches performed by the medical professional 39 on the monitor 10 and on the infusion pump 10', these further depend on touch sensors 3 arranged on one of their surfaces. Additionally, with a view to detect the handling of the catheter 10' by the doctor 39, the latter has a movement sensor 4 associated to said catheter 10".

One considers that the cleaning protocol of the hospital environment represented in FIG. 8 is as follows: one should clean one's hands right upon entering the environment, right after contact with a surface or equipment and right after contact with the patient.

One further considers a determined displacement made by the medical professional 39, such as the path indicated by the displacement data 35 shown in FIG. 8. One observes that the medical professional 39 has cleaned his hands immediately after going into the hospital environment and then went to the monitor 10, for example, to evaluate the medication history of the patient 40.

Then, the doctor 39 moved as far as the infusion pump 10' to evaluate the dosage of intravenous medicament that will be administered to the patient and then handled the catheter 10" to position it correctly and connecting the blood flow of the patient 40. After this, the doctor 39 went directly to the exit of the hospital environment.

As shown in FIG. 8, one observes that during this displacement the medical professional 39 has cleaned his hands immediately after entering the hospital environment. In other words, one notices that the doctor 39 did not clean his hands after having contact with the monitor 10, with the infusion pump 10' and after contact with the invasive device 10" and handling it, these actions representing potential bacteria proliferating actions that cause contamination.

With the system 1 proposed in the present invention, this non-compliance with the cleaning practices would be duly detected by the infrared sensors 2, contact sensors 3, movement sensors 4, which would determine contact data 35 by the doctor 39 with the monitor 10 and infusion pump 10' (articles) of the hospital environment, and movement data 37 of the catheter 37 (article) used for administering drug to the patient, respectively.

Thus, the medical professional 39 that makes use of the wearable device 15 according to the teachings of the present invention will immediately be alerted to the non-compliance with the hand cleaning detected after contact with the monitor 10, infusion pump 10' and handling of the invasive device (catheter 10").

In this regard, FIG. 8 further illustrates possible representation of the virtual environment 16, considering the displacement made by the doctor 39. It is noted that after hand cleaning at the dispenser 6, the virtual environment 16 indicates, by means of a text element, a massage of compliance with the cleaning (t1).

However, after having detected the touch on the monitor 10 and the infusion pump 10' and not having detected actuation of dispenser 6, indications of non-compliance with the practices of cleaning one's hands are supplied to the doctor 39 (t2 and t3).

Similarly, a non-compliance indication, such as by means of representation of a ludic element 28, is viewed in the virtual environment 16, since handling of the catheter 10" has been detected and no hand cleaning was detected before the doctor 39 went out of the hospital environment.

Thus, the system 1 proposed in the present invention enables one to monitor the hand cleaning practices, considering the displacement made by the medical professional, as well as the contact by him with determined pieces of equipment and the handling of invasive devices, as for example, catheters.

With a view to evaluate the cleaning practices of the hospital environment, one should send a history of the indications sent to the wearable device 15 to a control central of the hospital environment. Similarly, the displacement data 35, contact data 36, movement data 37, actuation data 38 and first 11 and second 11' cleaning signals should also be sent to a control central of the hospital environment, thus enabling the management to evaluate the history of the whole hospital environment.

The teachings of the present invention may also be applied in training medical professionals at hospital environments.

For example, one considers the medical professional 39 who performed the actions in FIG. 8 to be a resident doctor in training. Thus, it was evidenced that this resident has violated a few cleaning practices of the institution. One understands that the reference to a resident doctor represents only a preferred characteristic of the invention, so that the teachings proposed herein may be applied to any professional of the health area.

With a view to inform the doctor 39 about the result of the training carried out, a compliance index 45 (for example, a percent scale) might be displayed in the virtual environment 16 of the wearable device 15 at the moment when the doctor leaves the hospital environment (t=5). Considering the example of FIG. 8, the compliance index 45 of the doctor 39 would be low, since a number of cleaning protocols were violated.

More specifically, the compliance index 45 may represent an adherence rate related to the hand cleaning practices, so that such an adherence rate can be obtained by dividing the number of time the cleaning took place by the total of cleaning opportunities. The result of this division, multiplied by 100, may represent the adherence rate.

It is pointed out that such a way of obtaining the compliance rate 45 represents only a preferred characteristic of the invention. So, in alternative embodiments, the compliance rate 45 might be represented by using one from the indicators 25, 26, 27 and 28, already discussed, or still by dividing the number of cleaning opportunities by the number of cleaning actions effectively performed.

In this regard, FIG. 9 illustrates the displacement and the actions performed by a medical professional 39 in a hospital environment, as well as representations of the virtual environment 16 displayed on the wearable device 15 according to the movement and the actions performed.

One observes that the doctor 39 cleaned his hands right upon entering the hospital environment (t1) and then had contact with the monitor 10. After this, and in compliance with the cleaning protocols, one observes a new cleaning action after contact with the monitor 10 and prior to contact with the infusion pump 10' (t3). Considering the teachings of the present invention, the cleaning action performed before contact with the infusion pump 10' was motivated through indication of the text element "Clean your hands" right after contact of the doctor 39 with the monitor 10 10 (t2).

After contact with the infusion pump 10' and before handling the catheter 10", the doctor 39 cleaned his hands again, motivated by the virtual representation of the infectious agent 30 (t4). Por fim, observa-se uma nova ação de higienização antes da saída do médico 39 do ambiente hospitalar.

Figure 10:
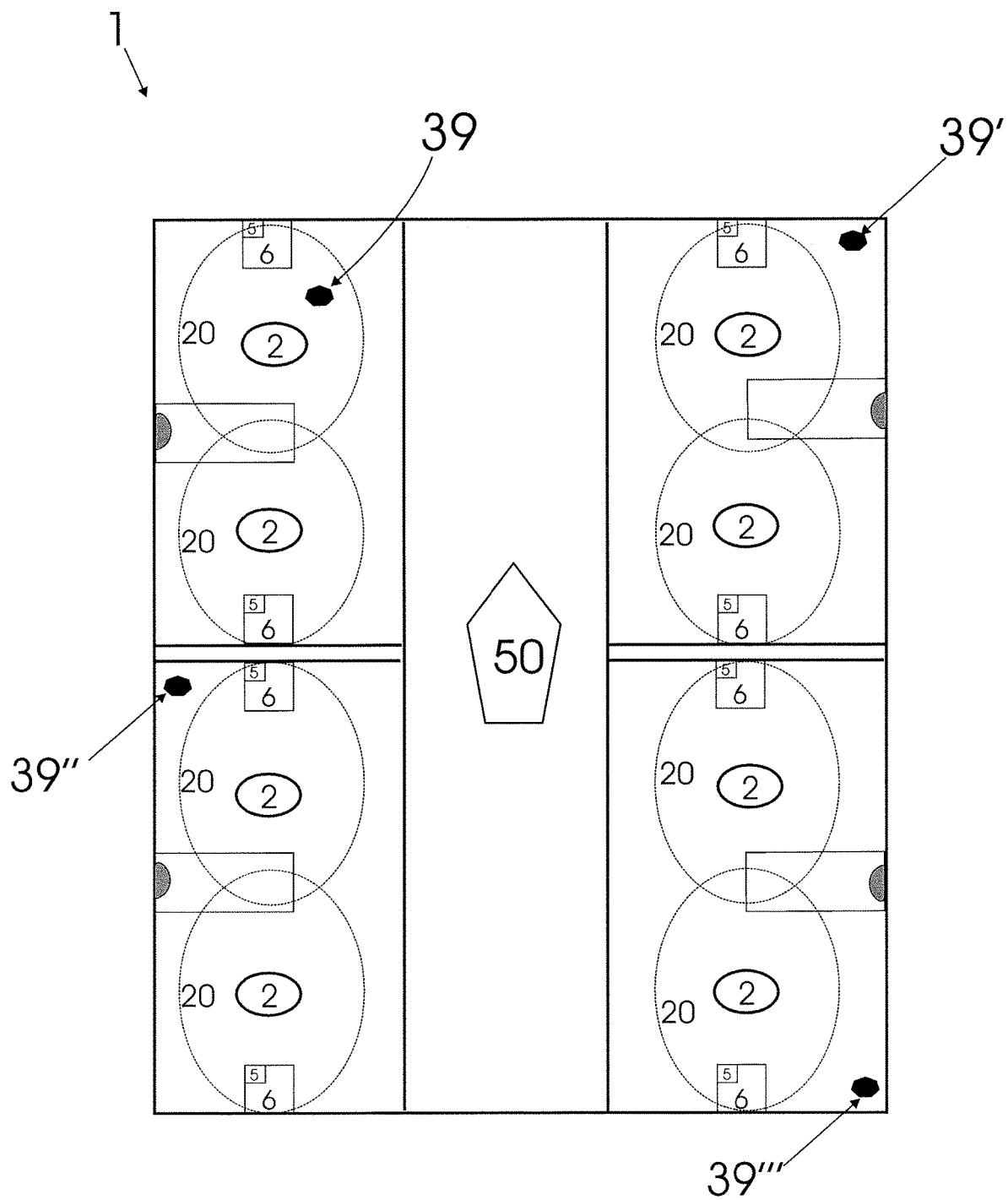
FIG. 10 is a representation of the use of the system proposed in the present invention for training medical professionals of a hospital environment.

In this representation of FIG. 9, one observes that the cleaning protocols were duly followed. So, if this displacement represents the training of a medical professional 39, the compliance index 45 would reach its maximum scoring, as shown in FIG. 10 (t6).

In the example discussed with reference to FIG. 9, the compliance index 45, also referred to as adherence rate, would reach its maximum value (100%). This is because the hand cleaning opportunities were as follows: A first cleaning opportunity upon entering the hospital environment, a second cleaning opportunity after contact with the monitor 10, a third cleaning opportunity after contact with the infusion pump 10', and a fourth cleaning opportunity after contact with the invasive device and contact with the patient.

Thus, a total of four cleaning opportunities were detected and, considering the displacement data 35 represented in FIG. 9, one notices a total of a total of four hand cleaning actions. In this way, the compliance rate 45 (adherence rate) would be obtained by dividing the total of cleaning actions effectively performed (4 actions performed) by the total of cleaning opportunities (4 opportunities). By multiplying by 100, one would obtain a compliance index of 100%.

With respect to the displacement data 35 of the medical professional 39, according to illustration of FIG. 8, one notices the same number of hand cleaning opportunities as compared with the representation of FIG. 9, that is to say: a first cleaning opportunity upon entering the hospital environment, a second cleaning opportunity after contact with the monitor 10, a third cleaning opportunity after contact with the infusion pump 10', and a fourth cleaning opportunity after contact with the invasive device and with the patient.

However, considering the displacement data 35 illustrated in FIG. 8, one observes only one cleaning action effectively performed (right after the medical professional 35 enters the hospital environment). Thus, by dividing the total of cleaning actions effectively performed (1 action performed) by the total of cleaning opportunities (4 opportunities), and multiplying the value by 100, one would obtain a compliance index 45 (adherence rate) of 25%.

It is pointed out that, with reference to FIGS. 8 and 9, the cleaning protocol used by the hospital environment is as follows: one should clean one's hands right after entering the hospital environment, right after contact with any surface or equipment, and right after contact with the patient. Obviously such a cleaning protocol should not be considered a limiting characteristic of the present invention.

Thus, one understands that the compliance index 45 represents an adherence rate related to the cleaning practices of a determined hospital environment. More specifically, the compliance index 45 is related to a cleaning action effectively performed (first cleaning signal 11) and a hand cleaning opportunity (second cleaning signal 11').

It is pointed out that, in the event of using the teachings of the present invention for training medical professionals, one advices indication in the virtual environment 16 only of the compliance index 45 after the doctor comes out of the hospital environment. In other words, possible representations of the indicators 25, 26, 27 and 28 that may alert the doctor to cleaning practices violated during the training (such representations at t2, t3 and t4 of FIG. 8) might not be displaced to the user. Obviously, it is up to the training instructor 50 to determine which indicators 26, 27, 28 and 45 should be displayed to the medical professional during their training.

The system 1 proposed in the present invention may be applied to various environments of a hospital (hospital environment) with a view to monitor, motivate and train the professionals with respect to the cleaning practices carried out within a hospital. In case the system 1 is used for training medical professionals, a single instructor 50 can coordinate the training of multiple professionals 39, 39', 39" and 39"', by using the wearable device 15, as shown in FIG. 10.

In this case, the instructor 50 may receive, in his computer, images captured at each of the wearable devices 15 used by the doctors 39, 39', 39" and 39m. Additionally, the instructor 50 may determine the sending of the indications 25, 26, 27, 28 and 45 to the virtual environment 16 of the devices 15 used by the doctors 39, 39', 39" and 39m, depending on the actions performed by the latter in their training.

Obviously, the reference to a personal computer of the instructor 50 should be considered only a preferred description of the present invention. Alternatively, any electronic component capable of receiving images and videos (such as a tablet, a cellular phone or even the wearable device 15) might be used.

Alternatively, each of the doctors in training 39, 39', 39" and 39" may also communicate with the instructor 50, for instance, for eliminating possible doubts that may rise during the training. This communication may take place through a communication system such as a Wi-Fi network of the hospital environment. Obviously, other communication forms are acceptable.

Further, the system 1 proposed in the present invention enables the instructor 50 to send to each of the wearable devices 15 of the doctors 39, 39', 39" and 39" an indication in video element 26, as shown in FIG. 4(a). In this video, the instructor 50 can inform the doctors 39, 39', 39" and 39" about which cleaning protocols are considered ideal and should be performed during the training. Thus, the indication in video element 26 may operate as a tutorial to the doctors in training.

If the teachings of the invention are applied to the practical monitoring and in real time of the cleaning actions in a hospital environment, one advices representation of the virtual environment 16 and of the indicators 25, 26, 27 and 28 as soon as a hand cleaning action has been correctly performed. In this way, the system 1 motivates the medical professional 39 to be always in compliance with the cleaning practices of the hospital environment.

In this case, the compliance index 45 may be used as a cleaning history 46 of the cleaning practices of a determined doctor after a period of time pre-determined by the hospital organization, that is, a history related to the adherence rate for hand cleaning by a medical professional. For example, one can use the compliance index 45 (adherence rate) to represent cleaning compliance by the doctor after performing a surgical procedure, or after a day or a month's work. Said cleaning history 46 may be sent to the hospital organization and may be configured as a compliance report, as preferably illustrated in FIG. 1.

In harmony with the system for monitoring the hand cleaning practices in a hospital environment, the present invention further approaches a method for monitoring the hand cleaning practices in a hospital environment, also referred to as only a monitoring method.

Figure 12:
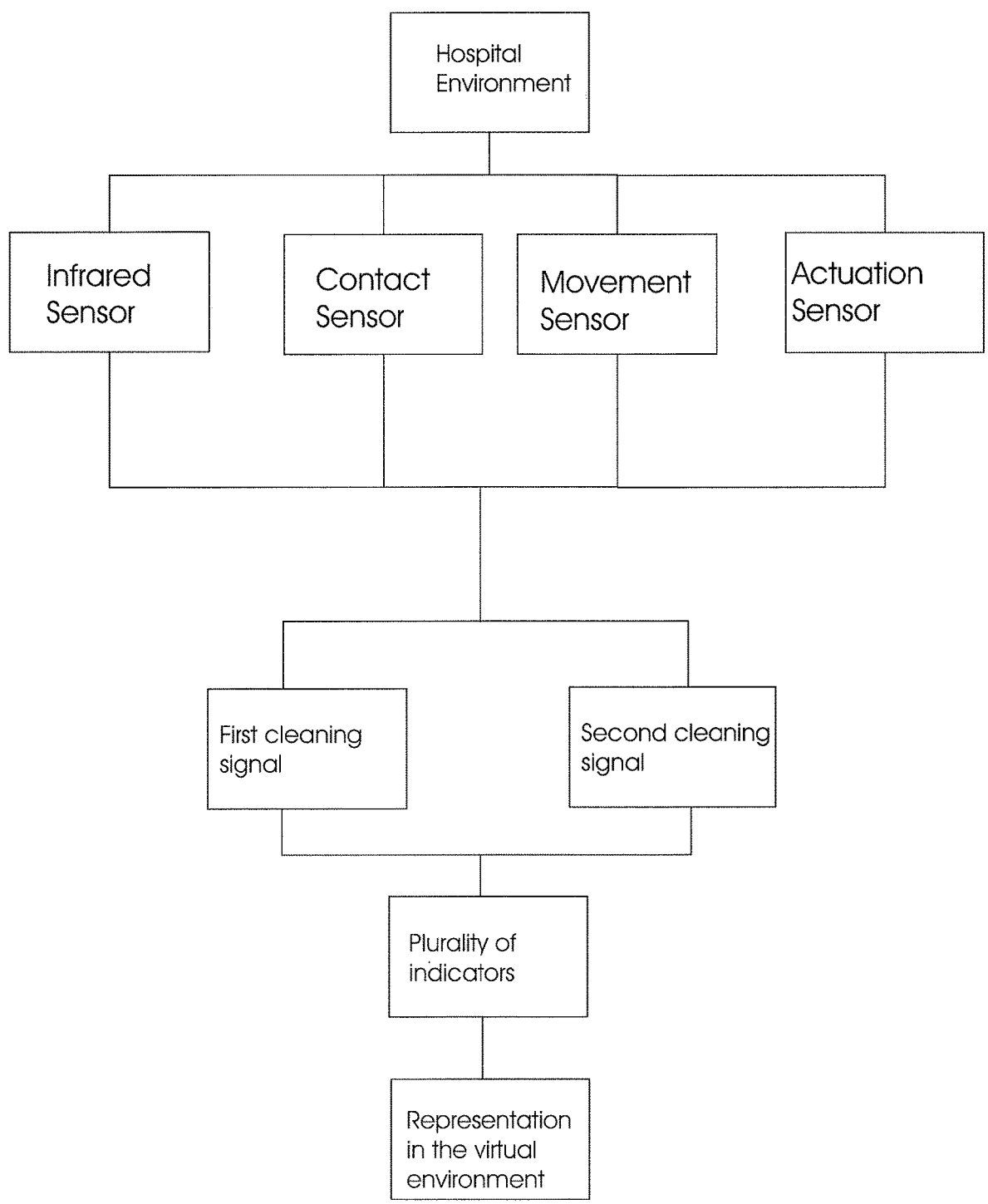
FIG. 12 is a block representation of the system and of the method for monitoring the practices of cleaning one's hands in a hospital environment proposed in the present invention.

FIG. 12 illustrates a block representation of the monitoring method proposed in the present invention. In harmony with the system 1 already described, the method comprises the step of generating a plurality of cleaning signals 11, 11' from data obtained from the set of sensors 2, 3, 4, 5.

Preferably, the set of sensors is configured as at least one from infrared sensor 2, contact sensor 3 of an article arranged in the hospital environment, movement sensor 4, and actuation sensor 5 of an aseptic substance dispenser.

In harmony with the system 1 described before, and with reference to FIG. 12, the monitoring method further comprises the step of generating a virtual environment 16 on a device wearable by a user, wherein the virtual environment 16 is visible to the user. The method further comprises the step of displaying a plurality of indicators 25, 26, 27, 28, 45 in the virtual environment 16, wherein the plurality of indicators 25, 26, 27, 28, 45 are related to the cleaning signals 11, 11'.

With reference to FIGS. 4, 6, 7, 8, 9 and 12, the monitoring method further comprises the step of generating a virtual representation of an infectious agent 30 in the virtual environment 16, the virtual representation of the infectious agent 30 configured as a transitory representation between a first state 231 and a second state 32. In the first state 31 the virtual representation of the infectious agent 30 is visible to the user, and in the second state 32 the virtual representation is not visible to the user.

Additionally, the method further comprises the step of actuating the actuation sensor 5 of an aseptic substance dispenser 6, so that the virtual representation of an infectious agent 30 will pass from the first state 31 to the second state 32.

In harmony with the system 1 descried before, the monitoring method proposed further comprises the steps of generating a first cleaning signal 11 by actuating the actuation sensor 5 of an aseptic substance dispenser 6, and generating a second cleaning signal 11' from at least one of the following data obtained from the set of sensors 2, 3, 4, 5: displacement data 35 of the user, obtained from the heat detection zones 20 of the infrared sensors 2, contact data 36 of the user with an article 10 of the hospital environment, obtained from the contact sensor 3, movement data 37 of the article 10 of the hospital environment, obtained from the movement sensor 4, and actuation data 38 of the aseptic substance dispenser 6.

Thus, the present invention relates to a method and to a system for monitoring the hand cleaning practices in a hospital environment and that make use of a plurality of sensors for monitoring the actions performed by a medical professional 39 within the hospital environment.

From the teachings of the present invention, one can track, for example, the movement of a medical professional 39, as well as determine whether the later has touched any surfaces that may be contaminated or potentiate the occurrence of contamination. Further, one can determine if he has handled an invasive device.

Additionally, the representation of the virtual environment 16 on the wearable device 15 enables an indication directly in the visual field of the doctor to be carried out, motivating such a professional to follow the cleaning protocols.

Moreover, the virtual representation of the infectious agent 30 through the ludic element 28, besides informing the medical professional about a violation of the cleaning protocols, immediately motivates him to perform a cleaning action, since the representation of the bacterium to the doctor gives the idea that the occurrence of an infection is evident. In this way, the representation of such an infectious agent ends up motivating the medical professional to perform a cleaning action immediately.

Finally, one understands that the description of a few elements and characteristics of the system and of the method proposed in the present invention should not be considered limitative of the invention.

For example, the reference to a cleaning protocol like the known five cleaning moments should not be considered a limiting feature of the invention, so that any hospital environment that makes use of the teachings of the present invention will be capable of defining the cleaning protocol that is most suitable to the cleaning practices of the hospital institution.

Further, the teachings of the present invention may also be applied not only to a medical professional of a hospital environment, but also to any person who moves inside said environment, service providers, among others.

Further, the teachings of the present invention may by applied to more than one hospital environment, for example, one may use the system 1 to monitor the hand cleaning practices in all the areas of a hospital, not only in a specific ward. For example, and in a non-limitative way, the teachings of the present invention may be applied to monitor cleaning compliance in a surgical center of a determined hospital.

Moreover, in addition to the sensors 2, 3, 4 and 5 discussed in the present invention, the system and the method proposed further enable integration of other types of sensors not discussed in the present invention. For example, one may use the sensor to monitor the opening and closing of doors of the hospital environment, thus determining when a determined person entered or left the environment.

Finally and in addition to the indication of the plurality of indicators 26, 27, 28 and 45 on the wearable device 15, one may further display a light signal on an indicating device 80 arranged close to the bed of the patient, such a signal being an indication of compliance with the cleaning protocols.

Additionally, the wearable device 15 can further provide, through the virtual environment 16, information to the medical professional about the patient, as well as about the environment in which it is arranged, as for example: precaution bed, pathology of the patient, type of procedure to be carried out, and steps involved in the procedure to be carried out.

A preferred example of embodiment having been described, one should understand that the scope of the present invention embraces other possible variations, being limited only by the contents of the accompanying claims, which include the possible equivalents.

The invention claimed is:

1. A system for monitoring a hand-cleaning practice in a hospital environment, the system comprising a set of sensors configured as at least one from:
   at least one infrared sensor establishing a heat detection zone,
   at least one between a contact sensor and a movement sensor associated to at least one article of the hospital environment,
   at least one actuation sensor of an aseptic substance dispenser,
   wherein the set of sensors is configured to generate a plurality of cleaning signals, the cleaning signals associated to a hand-cleaning event, the system further comprising:
   a wearable device to be worn by a user of the system, wherein the wearable device is configured to generate a virtual environment visible by the user, wherein a plurality of indicators related to the cleaning signals are displayed in the virtual environment,
   wherein the system is further configured to generate a virtual representation of an infectious agent in the virtual environment, the virtual representation of the infectious agent configured as a transitory representation between a first state and a second state, wherein:
   in the first state the virtual representation of the infectious agent is visible to the user, and
   in the second state the virtual representation of the infectious agent is not visible to the user,
   wherein the transition between the first state and the second state takes place through actuation of the actuation sensor of the aseptic substance dispenser.

2. The system according to claim 1, wherein the plurality of indicators is configured as at least one from a graphic element, a video element, a text element, a ludic element and a compliance index.

3. The system according to claim 2, wherein the ludic element is configured as the virtual representation of the infectious agent.

4. The system according to claim 3, wherein the actuation of the actuation sensor generates a first cleaning signal related to the hand-cleaning act.

5. The system according to claim 4, wherein the set of sensors is configured to generate a second cleaning signal, the second cleaning signal related to a hand-cleaning opportunity.

6. The system according to claim 5, wherein the second cleaning signal is generated from at least one from the following data:
   data of displacement of the user, obtained from the heat detection zones,
   data of contact of the user with the article of the hospital environment, the data of contact being obtained from the contact sensor;
   data of movement of the article of the hospital environment, the data of movement being obtained from the movement sensor; and
   data of actuation of the aseptic substance dispenser.

7. The system according to claim 1, wherein the virtual environment is configured as an environment in augmented reality.

8. The system according to claim 5, wherein the compliance index represents an adherence rate related to the first cleaning signal and to the second cleaning signal, wherein the compliance index is obtained from a number of cleaning actions effectively performed and a number of hand-cleaning opportunities.

9. A method for monitoring a hand-cleaning practice in a hospital environment, the hospital environment comprising a set of sensors configured as at least one from infrared sensor, contact sensor, movement sensor, and actuation sensor of an aseptic substance dispenser, the method further comprising the steps of:
   generating a plurality of cleaning signals from data obtained from the set of sensors,
   generating a virtual environment on a wearable device to be worn by a user, wherein the virtual environment is visible to the user, and
   displaying a plurality of indicators in the virtual environment, wherein the plurality of indicators are related to the cleaning signals, wherein the method further comprises the steps of:
   generating a virtual representation of an infectious agent in the virtual environment, the virtual representation of the infectious agent being configured as a transitory representation between a first state and a second state, wherein in the first state the virtual representation for the infectious agent is visible to the user, and in the second state the virtual representation of the infectious agent is not visible to the user, the method further comprising the step of:
   actuating the actuation sensor of the aseptic substance dispenser, so that the virtual representation of the infectious agent will pass from the first state to the second state.

10. The method according to claim 9, wherein the method further comprises the step of:

generating a first cleaning signal by actuating the actuation sensor of the aseptic substance dispenser, and generating a second cleaning signal from at least one from the following data obtained from the set of sensors:

data of displacement of the user, obtained from heat detection zones of the infrared sensors, data of contact of the user with an article of the hospital environment, the data of contact obtained from the contact sensor, data of movement of the article of the hospital environment, the data of movement obtained from the movement sensor; and data of actuation of the aseptic substance dispenser.

11. The method according to claim 10, wherein the first cleaning signal is related to the hand-cleaning act, the method further comprising the step:

generating a compliance index related to the first cleaning signal and to the second cleaning signal, wherein the compliance index is generated from a division between a number of cleaning actions effectively performed and a number of cleaning opportunities, the method further comprising the step of:

representing the compliance index in the virtual environment.

12. A wearable device to be worn by a user of a hospital environment, the hospital environment comprising a set of sensors configured as at least one from infrared sensor, contact sensor, movement sensor, and an actuation sensor of an aseptic substance dispenser, wherein the set of sensors is configured to generate a plurality of cleaning signals associated to at least one cleaning event, wherein the wearable device is configured to generate a virtual environment visible to the user, wherein a plurality of indicators related to at least one cleaning event is displayed in the virtual environment, wherein the wearable device is further configured to generate a virtual representation of an infectious agent in the virtual environment, the virtual representation of the infectious agent configured as a transitory representation between a first state and a second state, wherein:

in the first state the virtual representation of the infectious agent is visible to the user, and in the second state the virtual representation of the infectious agent is not visible to the user, wherein the actuation of the actuation sensor establishes the transition from the first state to the second state of the virtual representation of the infectious agent.

13. The wearable device according to claim 12, wherein the plurality of indicators is configured as at least one from a graphic element, a video element, a text element, a ludic element, and a compliance index.

14. The wearable device according to claim 13, wherein the infrared sensor establishes a heat detection zone, and the contact sensor and the movement sensor are associated to at least one article of the hospital environment.

* * * * *